United States Patent [19]

Kanao

[11] Patent Number: 5,193,588
[45] Date of Patent: Mar. 16, 1993

[54] PRESSURE-RESISTANT HELICAL CORRUGATED PIPE

[76] Inventor: Shiro Kanao, No. 9-18, Nanpeidai 4-chome, Takatsuki-shi, Osaka, Japan

[21] Appl. No.: 834,874

[22] Filed: Feb. 13, 1992

Related U.S. Application Data

[62] Division of Ser. No. 440,174, Nov. 22, 1989, Pat. No. 5,109,889.

[30] Foreign Application Priority Data

Dec. 27, 1988 [JP] Japan .................. 63-333132

[51] Int. Cl.$^5$ ........................ F16L 9/16; F16L 9/06
[52] U.S. Cl. ........................ 138/133; 138/121; 138/122; 138/154; 138/173; 138/174
[58] Field of Search ............. 138/118, 121, 122, 172, 138/173, 129, 174, 132, 134, 154, 133

[56] References Cited

U.S. PATENT DOCUMENTS

| | | | |
|---|---|---|---|
| 3,198,873 | 8/1965 | Ryan et al. | 138/133 |
| 4,140,154 | 12/1979 | Kanao | 138/122 |
| 4,838,317 | 6/1989 | Andre et al. | 138/122 |
| 4,862,924 | 9/1989 | Kanao | 138/122 |
| 4,976,289 | 12/1990 | Umemori et al. | 138/122 |
| 4,998,563 | 3/1991 | Nagoyoshi et al. | 138/122 |
| 5,007,462 | 4/1991 | Kanao | 138/122 |

FOREIGN PATENT DOCUMENTS

| | | | |
|---|---|---|---|
| 413399 | 7/1934 | United Kingdom | 138/122 |
| 611998 | 11/1948 | United Kingdom | 138/122 |

Primary Examiner—James E. Bryant, III
Attorney, Agent, or Firm—Sughrue, Mion, Zinn, Macpeak & Seas

[57] ABSTRACT

A pressure-resistant helical corrugated pipe comprises a helical corrugated pipe wall having a top portion, opposite side wall portions and a bottom portion; a continuous thin metal belt plate of a generally U-shaped transverse cross-section which is disposed in one of the top portion and the bottom portion and also in at least part of the opposite side wall portions extending from the one of the top portion and the bottom portion; another metal belt plate of a flat configuration being disposed in the other of the top portion and the bottom portion and disposed out of contact with the thin metal belt plate; and connective belt regions provided between the two metal belt plates in which the metal belt plates are absent, the connective belt regions being made of a synthetic resin or rubber to interconnect the two metal belt plates.

6 Claims, 3 Drawing Sheets

PRESSURE-RESISTANT HELICAL CORRUGATED PIPE

This is a divisional of application Ser. No. 07/440,174 filed Nov. 22, 1989, now U.S. Pat. No. 5,109,889.

BACKGROUND OF THE INVENTION

This invention relates to a pressure-resistant helical corrugated pipe mainly adapted to be buried in the ground, so that telecommunication cables such as an electric cable and a telephone cable can be installed in such a corrugated pipe for the purpose of protecting such cables. Also, such a corrugated pipe is used as a water main pipe, a sewer pipe, or a liquid transport pipe used in a plant or a factory Among such conventional pressure-resistant helical corrugated pipes, the type of corrugated pipes adapted for underground use have been required to be pressure-resistant in order to withstand a great ground pressure. In a conventional underground pressure-resistant pipe (see, for example, Japanese Laid-Open Utility Model Application No. 141889/86 field by the Applicant of the present application), a continuous reinforcing belt plate made of a thin metal plate is embedded in the pipe wall and extends over the top portion of the helical corrugation, the opposite side wall portions, extending from the top portion, and part of bottom portion.

However, when the metal reinforcing belt plate to be thus embedded in the pipe wall is of such a unitary construction that this plate can be disposed in the top portion and the opposite side wall portions, with its oppositely-projecting side edge portions disposed in part of the bottom portion as described above, the pipe is less flexible (though having a certain degree of flexibility) although its pressure-resistant strength to withstand the flattening is quite excellent. As a result, the pipe, when bent, inevitably has a large radius of curvature. Thus, it is difficult to provide a pipe which can be bent into a small radius of curvature. Further, the shaping and working of the metal reinforcing belt plate are difficult. Another problem is that it is difficult to obtain helical corrugated pipes having different helical pitches, using such a metal reinforcing belt plate of an identical shape.

SUMMARY OF THE INVENTION

Therefore, an object of the present invention is to provide a pipe in which although a belt plate of a thin metal plate is embedded in a pipe wall to increase its pressure-resistant strength to withstand the flattening (in some cases, the metal belt plate is exposed at the surface of the pipe wall), the problems with respect to the flexibility and the manufacture encountered with the above prior art pipe are overcome, and the amount of covering synthetic resin material used in the above prior art pipe is reduced to decrease the overall weight of the pipe, and the pressure-resistance of the pipe is rendered excellent.

According to the present invention, there is provided a pressure-resistant helical corrugated pipe having a helical corrugated pipe wall wherein the corrugation of the pipe wall is formed by a top portion, opposite side wall portions extending from the top portion and a bottom portion disposed close to the axis of the pipe; a continuous belt plate in the form of a thin metal plate of either a generally U-shaped transverse cross-section or a generally inverted U-shaped transverse cross-section is disposed in one of the top portion and the bottom portion and also in at least part of the opposite side wall portions that extend from the one of the top portion and the bottom portion, the metal belt plate serving as a constituent element for the pipe wall; another metal belt plate of a flat configuration is disposed in the other of the top portion and the bottom portion and is disposed out of contact with the thin metal belt plate; those portions provided between the two metal belt plates serve as connective belt regions in which the metal belt plates are absent; and the connective belt regions are made of a synthetic resin or rubber to interconnect the two metal belt plates.

When the pipe of this construction is, for example to be buried in the ground, a groove is dug in the ground at a required depth at the installation site, and the pipe is installed along the groove. When this pipe is used as a protective pipe for a cable, an electric cable or a telephone cable is passed through the pipe using a leading wire, and then the dug soil is applied to the pipe from above to cover it. In such installation of the pipe, when the pipe is required to be relatively sharply bent with a relatively small radius of curvature because of limitations imposed by geological features and geographical features of the installation site and existing building structures, the pipe of the present invention can be freely bent to a certain extent since the two connective belt regions in which the metal belt plates are absent, are provided at the opposite sides of one of the top portion of the pipe wall or at those portions of the opposite side wall portions adjacent to the opposite sides of one of the top and bottom portions. Therefore, the pipe can be easily installed without locally applying undue tension and compression to the pipe wall.

BRIEF DESCRIPTION OF THE DRAWINGS

FIGS. 1 to 3 are illustrative of a first embodiment of the present invention, in which FIG. 1 is a partly-broken, front-elevational view of a pipe, FIG. 2 is a longitudinal cross-sectional view of a main portion of the pipe, and FIG. 3 is an exploded, cross-sectional view of the main portion;

DETAILED DESCRIPTION OF THE PREFERRED EMBODIMENTS

Preferred embodiments of the present invention will now be described with reference to the drawings.

Figure 1:
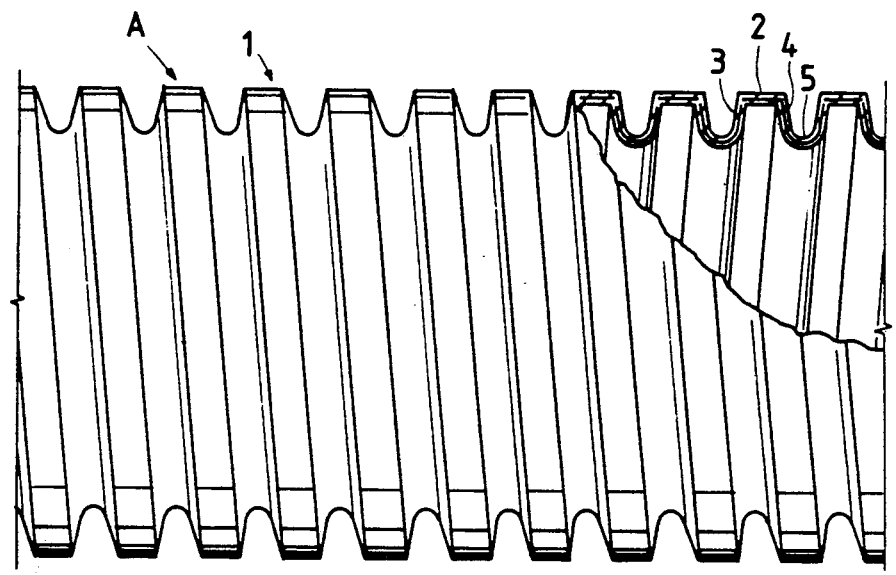
Figure 2:
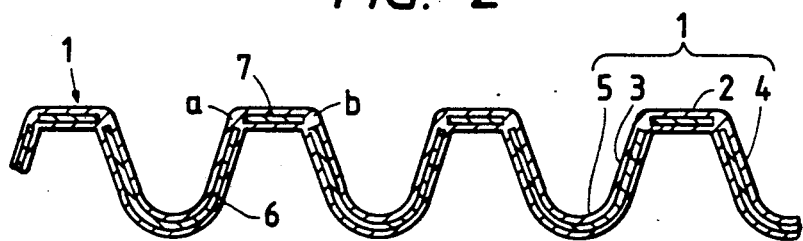
Figure 3:
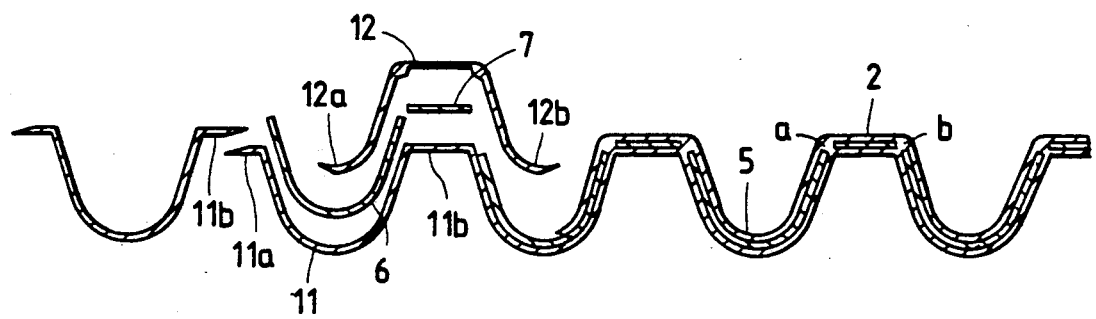

FIGS. 1 to 3 show one preferred embodiment (hereinafter referred to as "first embodiment") of the present invention. A helical corrugated pipe A shown in FIG. 1 has a pipe wall 1 of such a cross-sectional shape that a bottom portion 5 is of a generally U-shaped whereas a top portion 2 is generally flat. As shown in FIG. 3, there are employed two kinds of metal belt plates 6 and 7. One metal belt plate 6 is a steel belt which is shaped into a generally upwardly-opening U-shaped cross-section recessed at its central portion, and the other metal belt plate 7 is a flat steel plate which is not subjected to any shaping operation. The U-shaped belt plate 6 is disposed in the bottom portion 5 and opposite side wall portions 3 and 4 extending from the bottom portion 5, the belt plate 6 being not present in the top portion 2. The flat belt plate 7 is disposed in the top portion 2. The two belt plates 6 and 7 are slightly spaced from each other at two corners of the top portion 2.

A belt member 11 is made of a synthetic resin, and has a generally upwardly-opening U-shaped cross-section, with its upper ends horizontally directed laterally outwardly away from each other to provide laterally extending projections 11a and 11b. For forming the helical corrugated pipe A of this embodiment, as shown in FIG. 3, the belt member 11 is sequentially wound helically in such a manner that the horizontal projections 11a and 11b overlap each other, and the thus overlapped portions are fused together to form an inner synthetic resin wall portion of the pipe wall 1. Thereafter, the U-shaped metal belt plate 6 is fitted in the U-shaped portion of this inner wall portion and is helically wound therealong, and also the flat belt plate 7 is held against the overlapped horizontal projections 11a and 11b and helically wound therealong. At this time, the inner wall portion is fused to be joined to the plates 6 and 7. Then, another synthetic resin belt member 12 of a generally inverted U-shaped cross-section having a flat base is helically wound with its opposite ends or edges 12a and 12b overlapping each other. At this time, the overlapped ends 12a and 12b are fused together, and also the belt member 12 is fused to be joined to the two metal belt plates 6 and 7 to form an outer synthetic resin wall portion of the pipe wall 1. In the thus obtained helical corrugated pipe construction as shown in FIG. 2, the two metal belt plates 6 and 7 are embedded in the pipe wall 1 constituted by the inner and outer belt members 11 and 12, and connective belt regions a and b made solely of the synthetic resin are provided respectively at the two corner portions of the top portion 2 of the pipe wall 1, the metal belt plates 6 and 7 being absent in the connective belt regions.

Figure 4:
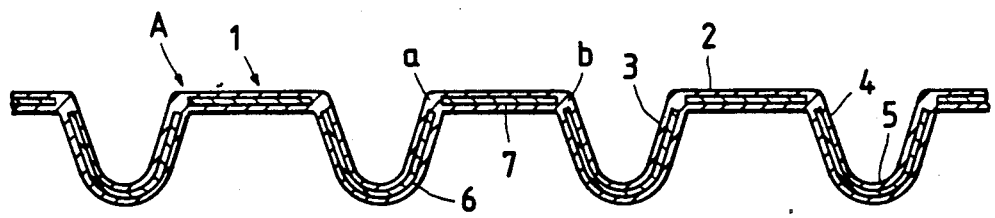
FIGS. 4 and 5 are longitudinal cross-sectional views of main portions of other embodiments of the invention, respectively.

In an embodiment of the invention shown in FIG. 4, there is provided a helical corrugated pipe A which employs a metal belt plate 6 processed into a generally U-shaped cross-section as in the first embodiment, and a flat metal belt plate 7 which is not subjected to any shaping operation and has a greater width than the flat metal belt plate used in the first embodiment. Each top portion 2 of a pipe wall 1 has a greater width in the direction of the axis of the pipe. The remainder is the same as in the first embodiment.

Figure 5:
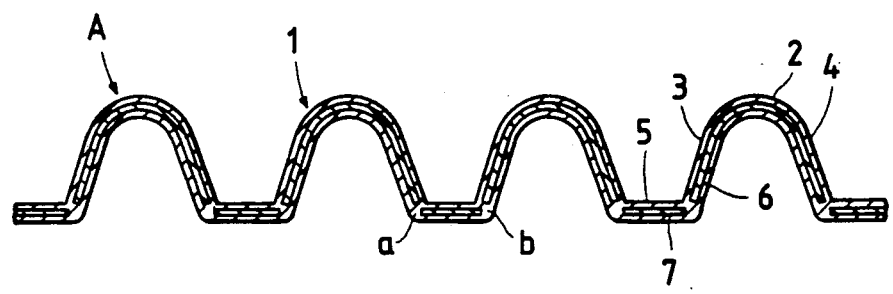

In an embodiment of the invention shown in FIG. 5, there is provided a helical corrugated pipe A which employs the metal belt plate 6 of a generally U-shaped and the flat metal belt plate 7 both of which are used in the first embodiment. In this embodiment, a top portion 2 of a pipe wall 1 is arcuate, and a bottom portion 5 is flat.

More specifically, the generally U-shaped metal belt plate 6 is inverted so that it extends over the top portion 2 and the opposite side wall portions 3 and 4 extending from the top portion 2. The flat metal belt plate 7 is disposed in the bottom portion 5, and connective belt regions a and b made solely of a synthetic resin are provided respectively at the two corner portions of the bottom portion 5. The metal belt plates 6 and 7 are absent in the connective belt regions.

Figure 6:
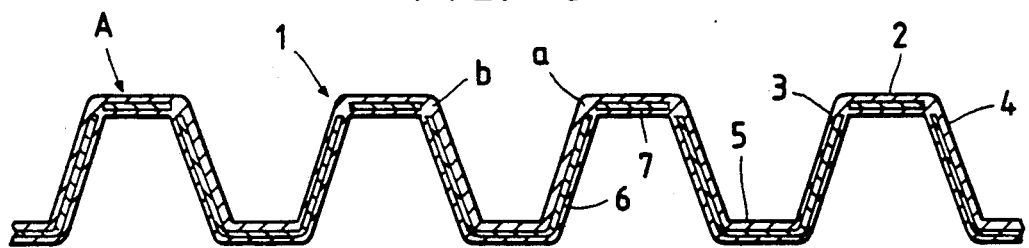
FIGS. 6 and 7 are a longitudinal cross-sectional view and an exploded, cross-sectional view of a further embodiment of the invention, respectively.
Figure 7:
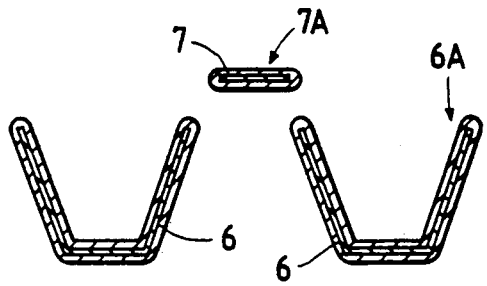

In an embodiment of the invention shown in FIGS. 6 and 7, there is provided a helical corrugated pipe A in which the cross section of the corrugation of a pipe wall 1 is trapezoidal. This pipe is produced by a method different from that for producing the pipe of the first embodiment.

In this embodiment, as shown in FIG. 7, there is employed a stainless steel belt plate 6 of a generally U-shaped cross-section resembling a trapezoidal shape having a shorter side and opposite inclined sides extending from this shorter side. Also employed is a flat belt plate 7 of stainless steel which is not subjected to any shaping operation. The two kinds of stainless steel belt plates 6 and 7 are passed through a synthetic resin extruder (not shown) so that the synthetic resin is fused to the plates 6 and 7 over the entire inner and outer peripheral surfaces thereof to provide molded belt members 6A and 7A. The belt member 6A of a generally U-shape is precedingly wound helically in such a manner that the turns of the thus wound belt member are spaced a predetermined distance from one another. Subsequently, the belt member 7A of a flat configuration is helically wound in such a manner that the belt member 7A overlaps and abuts against the adjacent the side edges of the precedingly wound belt member 6A to bridge the same, and these two molded belt members are fused to be joined together. Thus, the continuous helical pipe A is formed step by step.

In this embodiment, the synthetic resin is beforehand fused to be integrally joined to each of the metal belt plates 6 and 7 over its entire inner and outer surfaces. Thus, each metal belt plate is disposed within the synthetic resin layer. In this helical pipe, connective belt regions a and b made solely of the synthetic resin are provided respectively at the overlapped, interconnected portions of the two belt members 6A and 7A, as shown in FIG. 6. The metal belt plates 6 and 7 are absent in the connective belt regions.

In this embodiment, although the resin molded belt members 6A and 7A each integrally molded by the synthetic resin are directly wound and fused together to form the pipe wall 1, the pipe wall 1 may be formed by first winding the inner belt member 11, made solely of a synthetic resin, to form the inner resin wall portion of the pipe wall 1 as in the first embodiment and then by winding the molded belt members 6A and 7A around this inner resin wall portion and fusing them to be integrally joined together. Further, an outer layer or wall of a synthetic resin may be formed on the outer periphery of such a construction to cover the same. Alternatively, without providing such an inner resin wall portion, the outer resin layer may be formed on the belt members 6A and 7A.

The material from which the metal belt plates 6 and 7 are made is not limited to a flat plate, and they can be made by a so-called perforated metal plate having a number of small perforations or punched holes formed therethrough. When synthetic resin layers are applied to such a metal plate having a number of small perforations, the synthetic resin layers on the opposite sides of the perforated metal plate flow through the perforations and are integrally joined together, so that the metal belt plate is firmly joined to the inner and outer resin layers. However, as described above in the above embodiments, the metal belt plates 6 and 7 used in the present invention are not necessarily limited to such a plate having the small perforations.

A method of manufacturing the resin molded belt members 6A and 7A is not limited to the above-mentioned method in which the synthetic resin is extruded from the die together with the metal belt plate 6, 7 to cover the same. For example, there can be used a covering method in which the metal belt plate 6, 7 is dipped in a molten synthetic resin, and also other coating and resin-application methods can be used.

Figure 8:
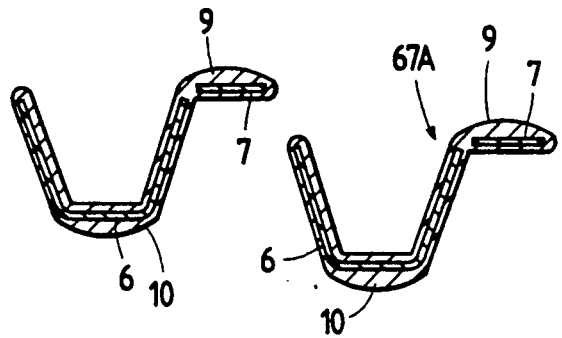
FIG. 8 is an exploded, cross-sectional view of a portion of a further embodiment of the invention.
Figure 9:
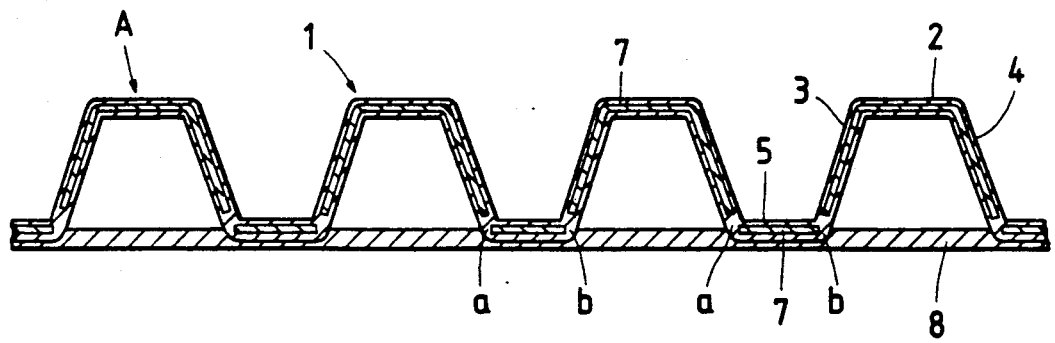
FIGS. 9 to 11 are longitudinal cross-sectional views of main portions of further embodiments of the invention, respectively.

FIG. 8 shows a modified method of producing the helical corrugated pipe A of FIG. 6. In this embodiment, the two kinds of resin molded belt members 6A and 7A shown in FIG. 7 are integral with each other to provide a belt member 67A containing the two metal belt plates 6 and 7 therein. More specifically, the belt member 67A is extruded from a resin extruder in such a manner that the flat belt plate 7 is connected to one upper side edge of the generally U-shaped belt plate 6 by the molding resin material but is disposed out of contact therewith. The belt member 67A is helically wound with its opposite side edges fused together to provide an integral construction, thereby forming the helical corrugated pipe. In this case, when the belt member 67A is inverted with the opposite side edges fused together at the bottom portion 5 of the pipe wall 1, there is obtained a pipe having connective belt regions a and b provided on the side of the bottom portion 5, as shown in FIG. 9.

Such a pipe construction is also obtained using the molded belt members 6A and 7A of FIG. 7.

It is not always necessary for the two kinds of metal belt plates 6 and 7 to be made of the same material and have the same thickness, and also the thickness of the resin layer constituting part of the pipe wall 1 is no always necessary to be uniform throughout the entire region thereof. Specifically, for example, the two kinds of metal belt plates 6 and 7 may be made of different materials such as iron and stainless steel, and as later described with reference to FIG. 10, the metal belt plate 6 may have a smaller thickness while the metal belt plate 7 may have a greater thickness. Also, as shown in FIG. 8, with respect to the resin layer thickness, the outer side 9 of the top portion 2 of the pipe wall 1 as well as the inner side 10 of the bottom portion 5 may be greater in thickness than the remainder.

In the case where such thickened resin portion is thus provided at the inner side of the bottom portion 5, even when wear develops due to the frictional contact of a cable or the like, the wear does not reach the metal belt plates 6 and 7, so that the metal belt plates 6 and 7 will not become bare, thus positively preventing these metal belt plates from being subjected to rust. In the case where such thickened resin portion is thus provided at the outer side of the top portion, even when the pipe is dragged at the time of installation thereof, and is brought into contact with a sharp corner of a stone or a rock so that the pipe is damaged, the metal belt plates 6 and 7, advantageously, will not be exposed immediately.

As shown in FIG. 9, if a cylindrical inner wall 8 made of flexible synthetic resin or rubber is formed internally of the pipe 1 to form an inner peripheral surface of the pipe wall 1, the pipe is suited for use as a water main pipe or a liquid transport pipe, since the liquid or the like offers less resistance.

The cylindrical inner wall 8 may be made of a rigid resin material, and if necessary, may be reinforced by a reinforcement material such as a fibrous material (e.g., threads, fabric and non-woven fabric), a metal plate and a metal net. With this construction, the pipe can withstand a high internal pressure and can be used as a high-pressure transport pipe.

In the above embodiments, the pipes includes the metal belt plates 6 and 7 which are covered with the covering or coating materials of a synthetic resin or the like over the entire inner and outer peripheral surfaces thereof. In other words, the pipes are of such a construction that the metal belt plates 6 and 7 are embedded in the pipe wall-forming material of a synthetic resin or the like. However, in the present invention, the metal belt plates 6 and 7 are not always required to be covered with a synthetic resin or the like over the entire peripheral surfaces thereof. In the case where the metal belt plates 6 and 7 are made of a rust-resistant material or a material which has been subjected to a rust-prevention treatment such for example as plating, electrophoretic deposition, metallic coating and resin baking finish, the pipe can be of such a construction that the metal belt plates 6 and 7 are partially exposed at the surface of the pipe wall, as in those embodiments mentioned below.

Figure 10:
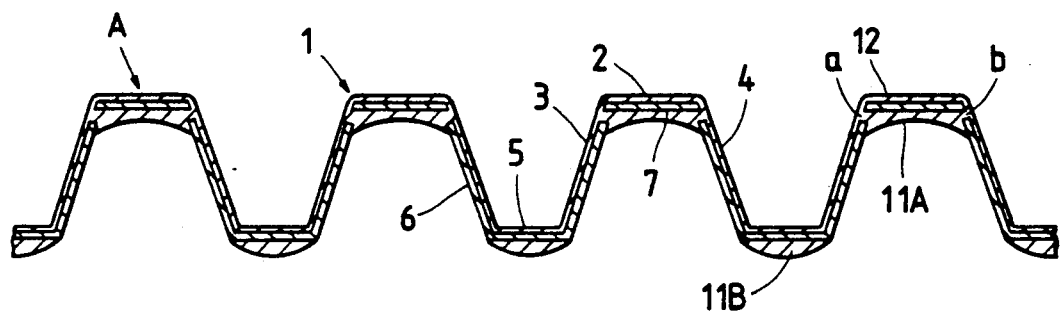

In an embodiment of the invention shown in FIG. 10, two kinds of metal belt plates 6 and 7 are used as in the embodiment of FIG. 6. The belt plate 6 of a generally upwardly-opening U-shaped cross-section is trapezoidal. The belt plate 6 of an upwardly-opening cross-section is arranged with its bottom disposed on the side of a bottom portion 5 of a pipe wall 1, in such a manner that the turns of the wound belt plate are spaced from one another. The flat belt plate 7 of a greater thickness is arranged on the side of a top portion 2 of the pipe wall 1. The entire outer peripheral surfaces of the metal belt plates 6 and 7 are covered with a resin belt member 12 to form an outer peripheral surface of the pipe wall 1. The inner side of the top portion 2 and the inner side of the bottom portion 5 are covered with resin layers 11A and 11B, respectively, so that connective belt regions a and b made solely of the synthetic resin are provided respectively at top portions of opposite side wall portions 3 and 4. The inner surface portions of the metal belt plate 6 defining the opposite side wall portions 3 and 4 are exposed at the inner surface of the pipe wall except for the top portions of the opposite side wall portions 3 and 4.

Figure 11:
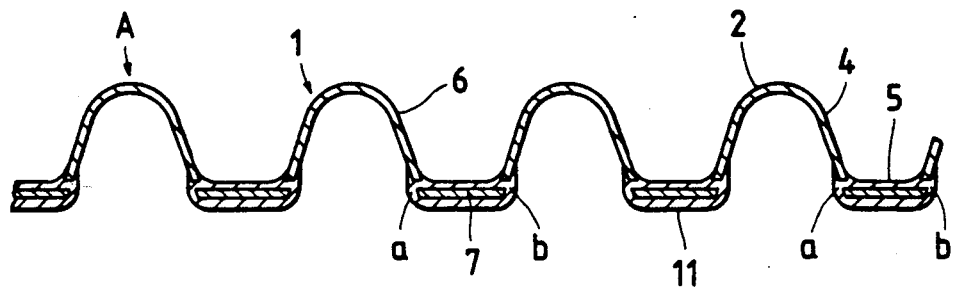

In an embodiment of the invention shown in FIG. 11, a metal belt plate 6 of a generally U-shaped cross-section is arcuate. This metal belt plate 6 is arranged on the side of a top portion 2 of a pipe wall 1, and a flat metal belt plate 7 is arranged on the side of a bottom portion 5. The inner and outer surfaces of the flat belt plate 7 as well as those portions of the inner and outer surfaces of opposite side wall portions 3 and 4 disposed adjacent to the bottom portion 5 are covered with resin layers 11 and 12, respectively. The top portion 2 of the pipe wall 1 formed by the U-shaped belt plate 6, as well as the major portions of the opposite side wall portions 3 and 4 extending from the top portion 2, remains bare at their inner and outer surfaces. The present invention can be embodied in this manner.

The helical corrugation of the pipe wall 1 is not limited to an arcuate shape or a trapezoidal shape, and may be of a channel-shaped cross-section. Also, the top portion and bottom portion of the pipe wall may be triangular in shape. Any other configuration may be employed. As to the material of the metal belt plates 6 and 7, instead of a stainless steel plate or a steel plate, an iron plate may be used. When forming the above-mentioned perforations (punched holes), the shape, size and density of such perforations can be suitably determined.

As to the synthetic resin material forming the layers covering the metal belt plates as well as the connective belt regions, a polyolefin such as polyethylene, polypropylene or the like, and a vinyl chloride can be mainly used, but other synthetic resins may be used. Also, rubber or a rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieves the advantageous effects of the invention mentioned below.

As described above in detail with reference to the preferred embodiments, in the present invention, the wide thin metal belt plates are used for forming the pipe wall. One of the metal belt plates is processed or deformed into a generally U-shaped cross-section or a generally inverted U-shaped cross-section, and the other metal belt plate is flat and is not deformed. These two kinds of metal belt plates are arranged in such a manner that they are not in contact with each other. The two connective belt regions made solely of the synthetic resin, in which the metal belt plates are absent, are provided at the top portion or the bottom portion of the pipe wall (at which the flat metal belt plate is provided) or those portions of the opposite side wall portions disposed adjacent thereto. With this construction, the helical corrugated pipe has a required pressure-resistant strength withstanding a flattening force because of the provision of the metal belt plates. Therefore, even when the metal belt plates are covered with the synthetic resin over the entire inner and outer peripheral surfaces thereof, such covering synthetic resin layers can be considerably reduced in thickness. This achieves such advantages as the reduction of the overall weight of the pipe, easier transport and handling of the pipe, and the reduction of the amount of the synthetic resin to be used. Also, since the two connective belt regions in which the metal belt plates are absent are provided at the top portion, the bottom portion or those portions disposed near thereto, the pipe can be flexed at these two connective belt regions, thus enhancing the flexibility of the pipe. Therefore, advantageously, when the pipe is to be installed, it is expected that the pipe can be bent with a relatively small radius of curvature so as to meet the variations in geological features and geographical features and to avoid obstacles such as a rock and building structure. Despite this, when manufacturing the pipe, only one of the two kinds of metal belt plates need be processed or deformed, and besides the one metal belt plate has only to be processed into a generally U-shaped cross-section to have a groove. Therefore, the processing or working is easy, and also by suitably selecting the width and thickness of the flat metal belt plate, the pipes having different pitches of the corrugation can be obtained. Further, there can be easily manufactured the pipe of the type in which only the top portion and the bottom portion have a greater strength than the remainder.

What is claimed is:

1. A pressure-resistant helical corrugated pipe, comprising:
   a helical corrugated pipe wall having a top, crest portion, opposite side wall portions extending from said top, crest portion and a bottom, trough portion disposed close to an axis of the pipe so as to be situated between adjacent top, crest portions;
   a continuous thin metal belt plate of a generally U-shaped transverse cross-section, said metal belt plate being disposed in said bottom, trough portion and also in substantially all of said opposite side wall portions that extend from said top, crest portion, said metal belt plate serving as a constituent element of said pipe wall;
   another metal belt plate of a flat configuration being disposed in said top, crest portion so as to be situated between adjacent bottom, trough portions of said helical corrugated pipe wall and disposed out of contact with said thin metal belt plate, said flat metal belt plate having a width substantially equal to a width of said top, crest portion in a direction of the axis of the pipe, such that said flat metal belt plate is disposed in substantially the entire width of said top, crest portion; and
   connective belt regions provided between said two metal belt plates in which said metal belt plates are absent, said connective belt regions being provided near connecting corner portions between said opposite side wall portions and said top, crest portion, said connective belt regions being made of a synthetic resin or rubber to interconnect said two metal belt plates.

2. A pressure-resistant helical corrugated pipe according to claim 1, further comprising a cylindrical inner wall provided in said pipe wall.

3. A pressure-resistant helical corrugated pipe according to claim 1, wherein said two belt plates are entirely covered with said synthetic resin or rubber.

4. A pressure-resistant helical corrugated pipe according to claim 1, wherein said two belt plates are subjected to a rust-preventing treatment and a part of said two belt plates is exposed at said helical corrugated pipe wall.

5. A pressure-resistant helical corrugated pipe according to claim 1, wherein said belt plates are made of a material selected from a group consisting of stainless steel, steel and iron.

6. A pressure-resistant helical corrugated pipe according to claim 1, wherein said synthetic resin is a material selected from a group consisting of a polyolefin and a vinyl chloride.

* * * * *